United States Patent
Vogl

(10) Patent No.: US 8,298,643 B2
(45) Date of Patent: Oct. 30, 2012

(54) METHOD OF MANUFACTURING AN OPTICAL DATA CARRIER

(75) Inventor: Christian Vogl, Adnet (AT)

(73) Assignee: SONY DADC Austria AG, Anif (AT)

( * ) Notice: Subject to any disclaimer, the term of this patent is extended or adjusted under 35 U.S.C. 154(b) by 851 days.

(21) Appl. No.: 12/353,614

(22) Filed: Jan. 14, 2009

(65) Prior Publication Data

US 2009/0181221 A1 Jul. 16, 2009

(30) Foreign Application Priority Data

Jan. 15, 2008 (EP) .................................. 08000676

(51) Int. Cl.
*B32B 3/02* (2006.01)

(52) U.S. Cl. .................. 428/64.1; 428/64.4; 430/270.11

(58) Field of Classification Search ................. 428/64.4; 430/270.11
See application file for complete search history.

(56) References Cited

U.S. PATENT DOCUMENTS

| | | | |
|---|---|---|---|
| 4,126,726 A | 11/1978 | Soeding | |
| 4,906,315 A | 3/1990 | McGrew | |
| 5,138,604 A | 8/1992 | Umeda et al. | |
| 5,533,002 A | 7/1996 | Abraham | |
| 2008/0291815 A1* | 11/2008 | Edwards | 369/283 |

FOREIGN PATENT DOCUMENTS

| | | |
|---|---|---|
| EP | 0 405 568 A2 | 1/1991 |
| EP | 1 519 249 A2 | 3/2005 |
| EP | 1 862 853 A2 | 12/2007 |
| WO | WO 93/08565 | 4/1993 |
| WO | WO 97/27584 | 7/1997 |

OTHER PUBLICATIONS

European Office Action issued Oct. 20, 2011, in Patent Application No. 08000676.0.

Office Action issued Mar. 31, 2012 in Chinese Patent Application No. 200910118731.5 (with English translaton).

* cited by examiner

*Primary Examiner* — Elizabeth Mulvaney
(74) *Attorney, Agent, or Firm* — Oblon, Spivak, McClelland, Maier & Neustadt, L.L.P.

(57) ABSTRACT

A method of manufacturing an optical data carrier, wherein an essentially uncured resin layer is provided on a side of said optical data carrier. The essentially uncured resin layer is embossed with a relief pattern, wherein the relief pattern defines a graphic.

4 Claims, 7 Drawing Sheets

METHOD OF MANUFACTURING AN OPTICAL DATA CARRIER

An embodiment of the invention relates to a method of manufacturing an optical data carrier. Further embodiments of the invention relate to an optical data carrier and an apparatus for manufacturing an optical carrier.

BACKGROUND

Optical data carrier such as e.g. compact discs (CD), digital versatile discs (DVD) and blu-ray discs (BD) are often provided with graphics on a side opposite to a reading/writing side of the optical data carrier. At least a part of such graphics may be embossed, i.e. a part of the graphics may be based on a relief pattern. This way it is possible to e.g. provide a hologram as graphic.

It is an object to provide a method of manufacturing an optical data carrier with a relief pattern defining a graphic. Further objects are to provide a respective optical data carrier and respective apparatus for manufacturing an optical data carrier. These objects are solved by claims 1, 9, and 13, respectively.

Further details will become apparent from a consideration of the drawings and ensuing description.

DETAILED DESCRIPTION

In the following, embodiments are described. All described embodiments may be combined in any way, i.e. there is no limitation that certain described embodiments may not be combined with others. Further, it should be noted that same reference signs throughout the figures denote same or similar elements.

Figure 1:
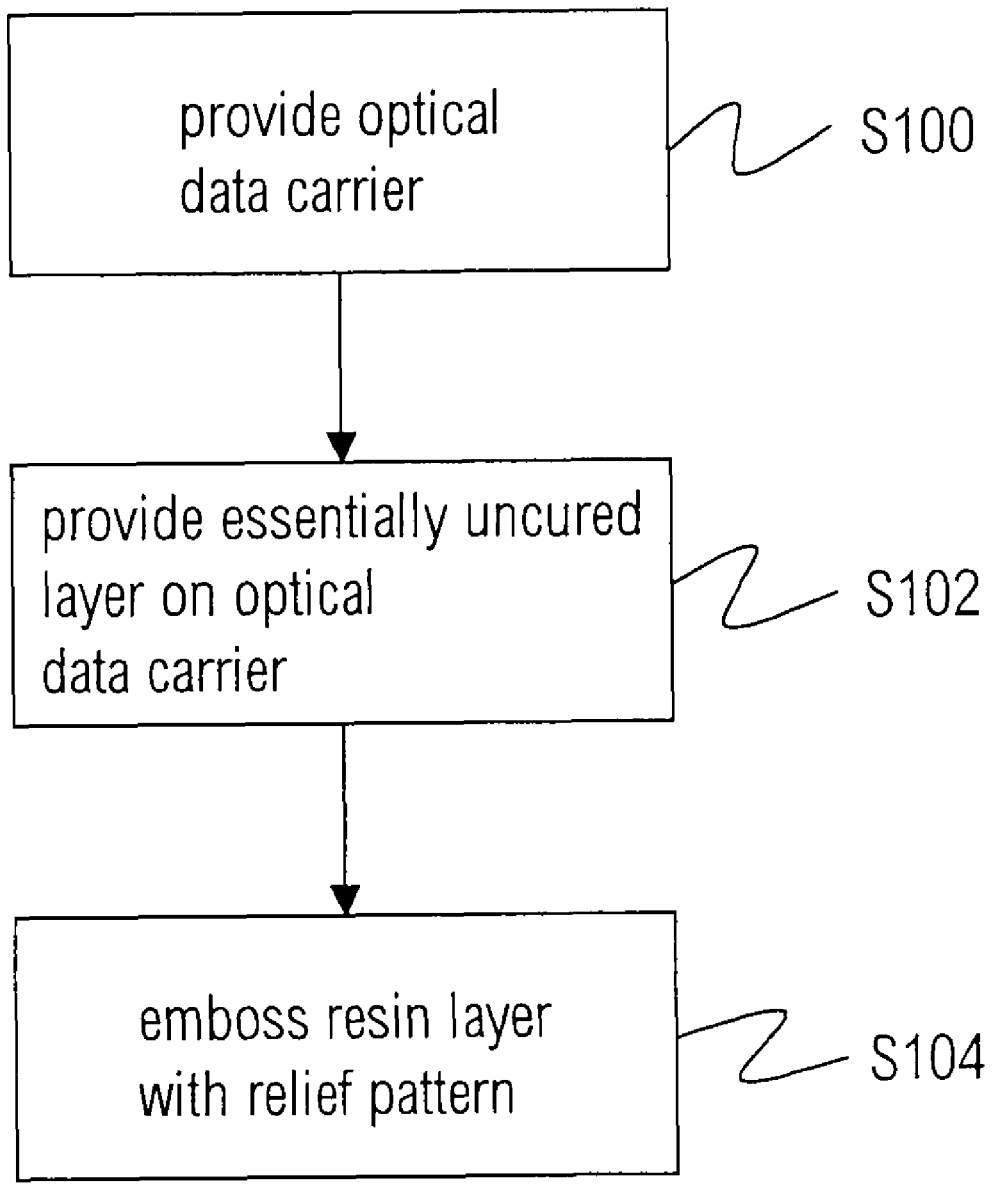
FIG. 1 illustrates a method of manufacturing an optical data carrier according to an embodiment.

In FIG. 1, at S100, an optical data carrier is provided. The optical data carrier may have a disc-shape. Alternatively, the optical data carrier may have a rectangular shape, for example if the optical data carrier has a card-shape. The optical data carrier may be of a standard format, such as e.g. an audio compact disc (CD), CD-ROM, digital versatile disc (DVD), dual disc, blu-ray disc (BD), or high density DVD (HD-DVD).

The optical data carrier might be a "completely finished" disc having a protective layer on a non-reading/writing side of the optical data carrier. Alternatively, the optical data carrier is still in a "raw state" and the non-reading/writing side of the disc has no protective layer.

At S102 of FIG. 1, an essentially uncured resin layer is provided on a side of the optical data carrier. For example, the essentially uncured resin layer might be provided on the non-reading/writing side of the optical data carrier. "Essentially uncured" means substantially uncured, in that over time, contact with an atmosphere may begin a curing process to a slight extent. In a further embodiment, the resin layer may be completely uncured. The resin layer may, therefore, also be referred to as being "wet" and/or having a high viscosity.

Then, at S104, the essentially uncured resin layer is embossed with a relief pattern. The relief pattern might define a graphic such as e.g. a hologram. The graphic may also be a "pit art", i.e. a graphic that is realized by pits in the resin layer.

Thus, at S104, the resin layer is embossed with the relief pattern in an uncured state. Therefore, a force used for embossing might be a low force e.g. in the range of 0.45 $N/cm^2$ to 8.85 $N/cm^2$ (5 kg to 100 kg). The force used for embossing might be considerably lower than a force that would be needed if the resin layer were embossed when in a cured state. Since the uncured resin layer is very flexible (high viscosity), the resin layer follows contours of an applied stamper (shim) very closely. The embossing of the relief pattern can therefore also be regarded as a pressing, imprinting or stamping of the relief pattern into the uncured resin layer.

Since the relief pattern is embossed (imprinted, stamped) with only a few kilograms the optical data carrier is not exposed to stress. Further, since the resin layer is embossed with the relief pattern in an uncured state, a high quality image can be realized since the uncured resin layer fills easily any spaces (moulds, gaps) of a stamper used for embossing. The result is an outstanding appearance of the graphics, wherein even the smallest surface defect and air inclusions are avoided. When embossing the uncured resin layer as explained, surface defects may be in the range of a few micrometers, e.g. 3-5 micrometers. When embossing a cured resin layer, the stamper (or shim) may touch and scratch the cured resin layer and surface defects in the range of 300-500 micrometers may occur.

Since the optical data carrier has less molecular stresses and high quality images can be realized, manufacturing costs are lowered due to few reject rates (high yield). Further, the optical data carrier might have a longer life time and higher quality. Still further, due to the low pressure, the stamper may last longer than if high pressures were used. The reason is that at high pressure dust between the stamper and surface of the data carrier destroys the stamper. At low pressure dust has no such negative effect.

Figure 2:
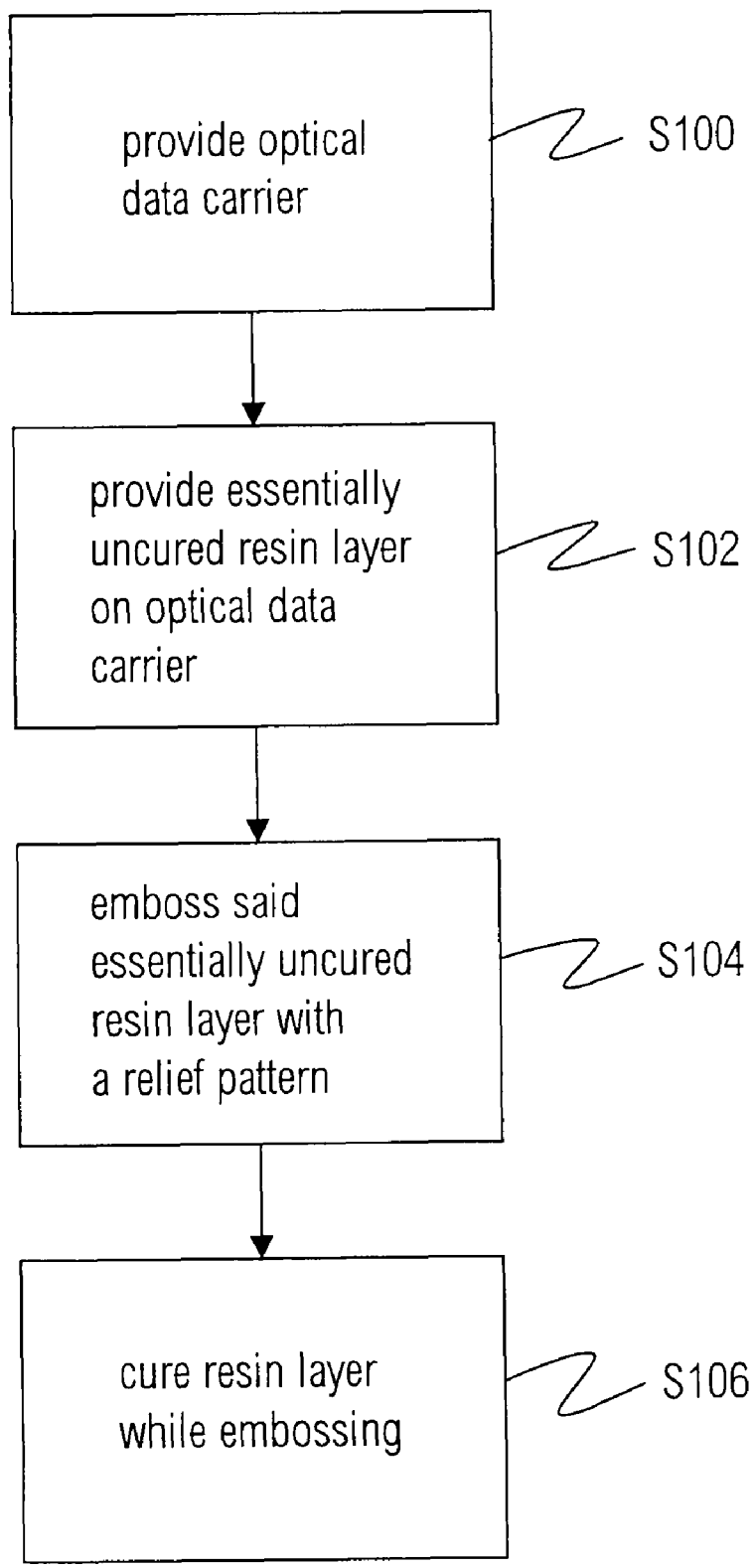
FIG. 2 further serves to illustrate a method of manufacturing an optical data carrier according to a further embodiment.

FIG. 2 illustrates a further embodiment of the invention where the stamper used for embossing is removed after a start of a curing process of the essentially uncured layer. In addition to blocks S100, S102 and S104 of FIG. 1 in the embodiment of FIG. 2, at S106, the resin layer is cured while embossing the resin layer with the relief pattern. Thus, in the embodiment of FIG. 2, the stamper used for embossing remains in an embossing position, i.e. in contact with a resin layer, while the resin layer is cured. The curing might e.g. be realized with ultraviolet (UV) light.

Thus, a curing process might be carried out during an embossing process. The stamper might be removed after a complete curing of the resin layer. Alternatively, when removing the stamper, the resin layer might not be completely cured, but it is only cured to an extent that the relief pattern remains stable enough to essentially be unaffected by removing the stamper.

In a further embodiment of the invention (not shown in Figs.), the stamper might be removed a predefined time period before starting a curing process of the essentially uncured resin layer. The time period might depend on a viscosity of the uncured resin layer and might be chosen so that the relief pattern remains essentially unchanged, when the curing starts. Thus, the predefined time period is a rather short time period, e.g. in the range of a few milliseconds.

Figure 3:
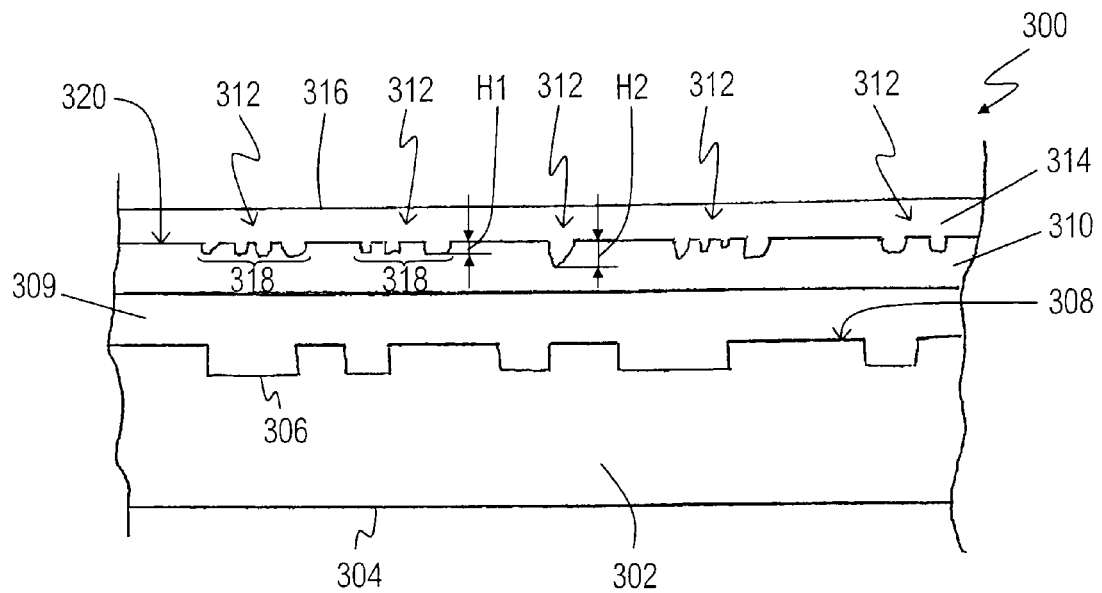
FIG. 3 illustrates a structure of an optical data carrier.
Figure 4:
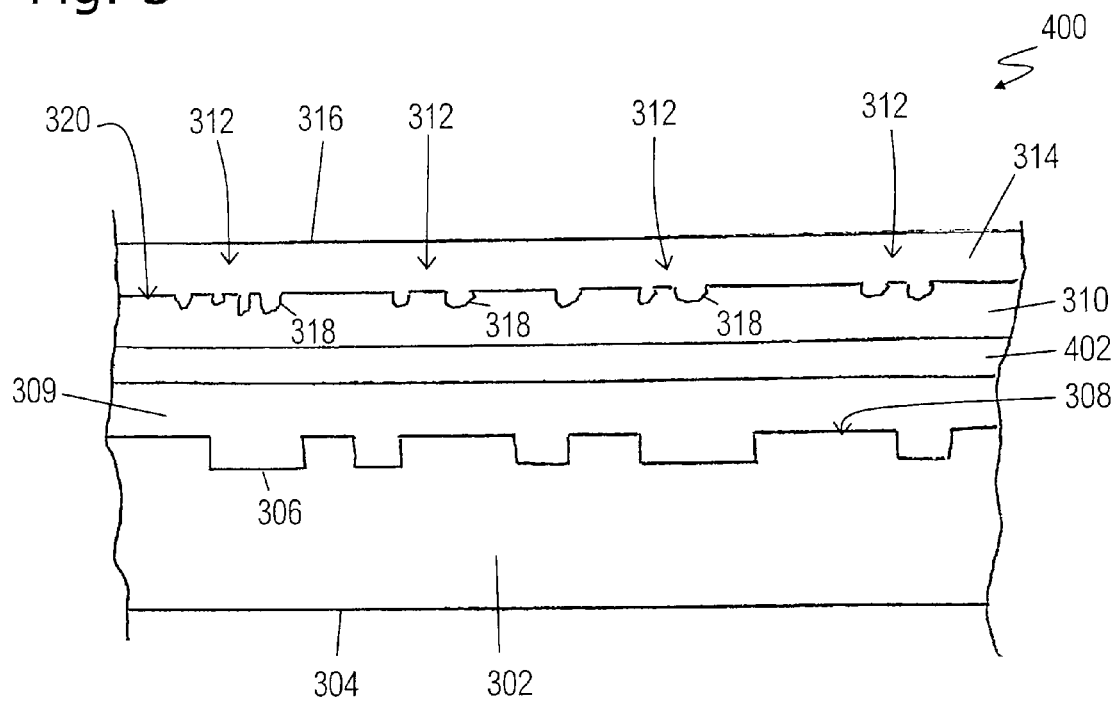
FIG. 4 illustrates a structure of an optical data carrier according to a further embodiment.

FIGS. 3 and 4 show two embodiments of the invention, in which a compact disc (CD) is used as data carrier.

In FIG. 3, a sectional view of a CD 300 is shown. CD 300 comprises a polycarbonate layer 302 forming a reading/writing side 304 of CD 300. Further, in polycarbonate layer 302 pits and lands 306 are formed comprising e.g. audio content if CD 300 is an audio CD.

CD 300 further comprises a reflective layer 308, a first protective layer 309, resin layer 310, and second protective layer 314. It is possible that first protective layer 309 and second protective layer 314 be omitted. In this case, resin layer 310 would adjoin polycarbonate layer 302. Further, in this case resin layer 310 could serve as a protective layer for the pits and lands structure 306.

Optionally, a further reflective layer 320 may be provided on relief pattern 312, i.e. on resin layer 310 or between resin layer 310 and second protective layer 314. Further reflective layer 320 may enhance the effects of the relief pattern. In case that the relief pattern defines a hologram, the hologram effect may be enhanced. Also, due to the high precision of the relief pattern resulting from embossing in an uncured resin layer, the reflective material used for manufacturing said reflective layer 320 may more accurately follow the contours of the relief. Thus, the image quality is very high.

Resin layer 310 comprises an embossed relief pattern 312 that at least partly defines a graphic. Resin layer 310 has been embossed with the relief pattern 312 while being in an uncured state. Thus, a level of molecular stress of the resin layer is below a further level of molecular stress that would occur if the resin layer where embossed with the relief pattern in an uncured state. In other words, resin layer 310 has essentially no or only very little molecular stresses. Further, the molecular stresses of layers 302, 309 might be very low when compared with a molecular stress that would occur if the relief were embossed with a high pressure e.g. within the range of 88.6 N/cm$^2$ or more (1,000 or more kilograms).

Further, resin layer 310 has no undesired embossing artifacts such as e.g. micro-cracks, burrs or the like that would occur if the resin layer were embossed with the relief pattern in a cured state and with a high pressure.

As mentioned, since CD 300 has been manufactured by providing the resin layer 310 in an uncured state and embossing the resin layer 310 with the relief pattern 312 while being in the uncured state, polycarbonate layer 302 and first protective layer 309 have no or only very little molecular stresses which are lower than respective molecular stresses that would occur if the resin layer 310 were embossed with the relief pattern 312 in a cured state. In other words, if the resin layer 310 were embossed with the relief pattern 312 in a cured state, a high pressure and possibly a heating of the resin layer 310 would be necessary. This would cause considerable stress on the lower layers 309, 302 thereby causing molecular stresses. Such molecular stresses in layers 309, 302 can be avoided since embossing resin layer 310 with the relief pattern 312 when resin layer 310 is in an uncured state is possible at very low pressures. When embossing the resin layer 310 with relief pattern 312 in a cured state, a pressure of 88.6 N/cm$^2$ to 886 N/cm$^2$ (1 to 10 tons) or more would be needed. When embossing resin layer 310 with relief pattern 312 in an uncured state, low pressures e.g. between 0.45 N/cm$^2$ and 17.7 N/cm$^2$ (between 5 kilogram and 200 kilogram) are sufficient. Relief pattern 312 may comprise protrusions and/or cavities defining a graphic viewable from a non-reading/writing side 316 of CD 300 due to optical effects such as e.g. refraction/reflection of light on the boundary between second protective layer 314 and resin layer 310. The optical effects are supported by the reflection on the reflective layer 308. An enhancement of the optical effects may be achieved by the optional further reflective layer 320.

The graphic might e.g. be a hologram, monogram or the like. Thus, it is possible that the protrusions/cavities 318 have different height/depth H1, H2.

The material of resin layer 310 may be referred to as "pit resin" since the same material might also be used for a layer comprising pits and lands comprising data.

FIG. 4 illustrates a sectional view of a CD 400 according to a further embodiment of the invention. The embodiment of FIG. 4 is similar to that of FIG. 3, however, between the resin layer 310 and first protective layer 309, a further resin layer 402 is provided.

Further resin layer 402 might be made of a material having good adhesion properties with respect to resin layer 310 as well as first protective layer 309. In other words, resin layer 310, further resin layer 402, and first protective layer 309 (also referred to as lower layer) might comprise or consist of a first, second, and third material, respectively, wherein a first adhesion force between the first and second material and a second adhesion force between the second and third material are larger than a third adhesion force between the first and third material.

Therefore, further resin layer 402 might also be regarded as an "adaptation layer" or "adhesion layer" that realizes a high adhesion force of resin layer 310 on lower layers of the CD (first protective layer 309 in the embodiment of FIG. 4).

Further, by providing further resin layer 402 sandwiched between resin layer 310 and first protective layer 309, the design of material for resin layer 310 becomes more flexible.

Regarding the material of resin layer 310, it should be noted that this material should be chosen to have a high adhesion force on the lower layer, whereas an adhesion force between the material of resin layer 310 and the material used for a stamper when embossing relief pattern 312 should be low.

Figure 5:
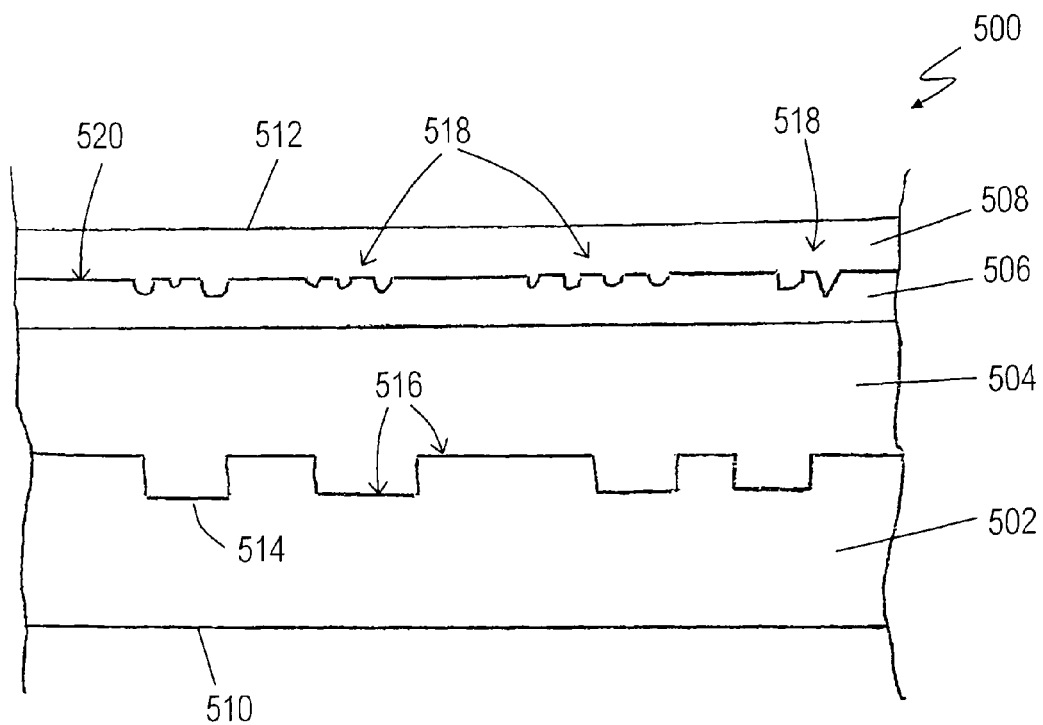
FIG. 5 illustrates a structure of an optical data carrier according to a further embodiment.

FIG. 5 illustrates a sectional view of a DVD 500. DVD 500 comprises a first polycarbonate layer 502, second polycarbonate layer 504, resin layer 506, and protection layer 508. Protection layer 508 is optional and might be omitted.

First polycarbonate layer 502 forms a reading/writing side 510 of DVD 500. On the opposite side of the reading/writing side 510 of first polycarbonate layer 502, the first polycarbonate layer 502 comprises pits and lands 514. The pits and lands 514 are provided with a reflective layer 516.

Opposite of the reading/writing side 510 of DVD 500, a non-reading/writing side 512 is formed by protection layer 508.

Further layers may exist. For example, there may be provided a bonding adhesive layer between layer 502 and 504 in order to improve adhesion of layers 502 and 504.

As in the embodiments of FIGS. 3 and 4, resin layer 506 comprises a relief pattern 518 defining a graphic. As before, the graphic might be a hologram or the like, and again the protrusions/cavities of relief pattern 518 might have different heights.

Also, as in FIGS. 3 and 4, optionally, a further reflective layer 520 may be provided on relief pattern 518, i.e. on resin layer 506 or between resin layer 506 and protective layer 508. The further reflective layer 520 may enhance the effects of the relief pattern. In case that the relief pattern defines a hologram, the hologram effect may be enhanced. Also, due to the high precision of the relief pattern resulting from embossing in an uncured resin layer, the reflective material used for manufacturing further reflective layer 520 may more accurately follow the contours of the relief. Thus, the image quality is very high.

Further, as already described in connection with FIGS. 3 and 4, all of the layers 502, 504, 506 and 508 might have no or only very little molecular stresses since resin layer 506 has been embossed with relief pattern 518 in an uncured state. Thus, no high pressures were applied when embossing and molecular stresses in layers 502, 504 are low. As also described in connection with FIGS. 3 and 4 a high quality graphic may be realized for the same reasons as already explained above.

In the example of FIG. 5, a single sided single layer DVD (DVD 5) is illustrated. The explained principles, however, are likewise applicable to a single sided dual/double layer DVD (DVD 9) or HD-DVD or other optical data carriers having a same or at least similar structure.

Figure 6:
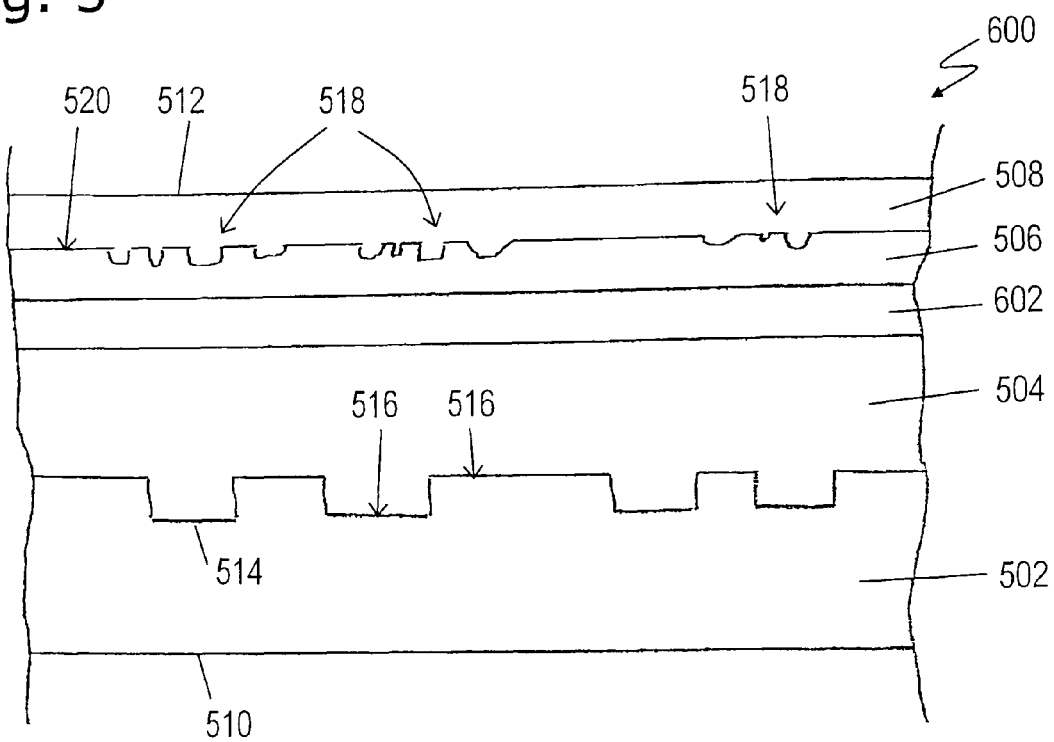
FIG. 6 illustrates a structure of an optical data carrier according to a further embodiment.

FIG. 6 illustrates a sectional view of a further DVD 600 according to a further embodiment of the invention. Similar as in the embodiments of FIGS. 3 and 4, when comparing the embodiment of FIG. 6 with the embodiment of FIG. 5, a further resin layer 602 is provided between resin layer 506 and second polycarbonate layer 504. As in the embodiment of FIG. 4, further resin layer 602 might be referred to as an "adaptation layer" realizing a strong adhesion force between layers 506 and 602, as well as between layers 602 and 504.

As in FIG. 5, in FIG. 6, further layers may exist. For example, there may be provided a bonding adhesive layer between layer 502 and 504 in order to improve adhesion of layers 502 and 504.

Figure 7:
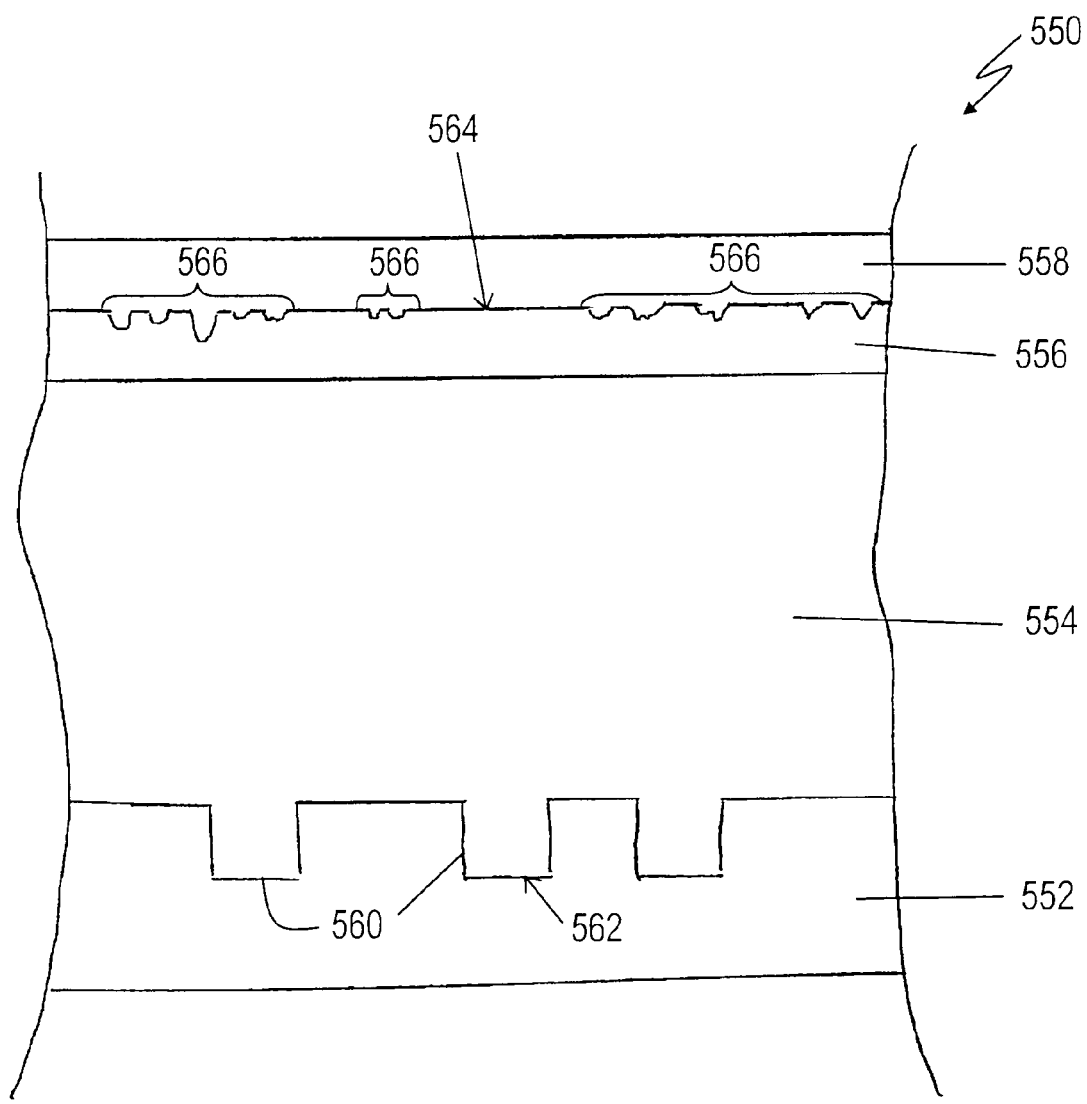
FIG. 7 illustrates a structure of an optical data carrier according to a further embodiment.

FIG. 7 illustrates a sectional view of a Blu-ray disc (BD) 550. Blu-ray disc 550 comprises a cover layer 552, polycarbonate layer 554, resin layer 556, and protective layer 558. Further, Blu-ray disc 550 comprises pits and lands structure 560 covered with a reflective layer 562.

Resin layer 556 comprises a relief pattern 566. As in the embodiments of FIGS. 3 to 6, optionally, a further reflective layer 564 may be provided on relief pattern 566 in order to enhance the effects of the relief pattern. As before, if relief pattern defines a hologram, the hologram effect may be enhanced. Also, as before, due to the high precision of the relief pattern resulting from embossing in an uncured resin layer, the reflective material used for manufacturing further reflective layer 564 may more accurately follow the contours of the relief. Thus, the image quality may be very high.

Further, as in FIGS. 3 to 6, all of the layers 552, 554, 556, 558 might have no or only very little molecular stresses, since resin layer 556 has been embossed with relief pattern 566 in an uncured state. Thus, no high pressures were applied when embossing and molecular stresses in these layers are low. As described above, a high quality graphic may be realized for the same reasons as already explained above.

Figure 8:
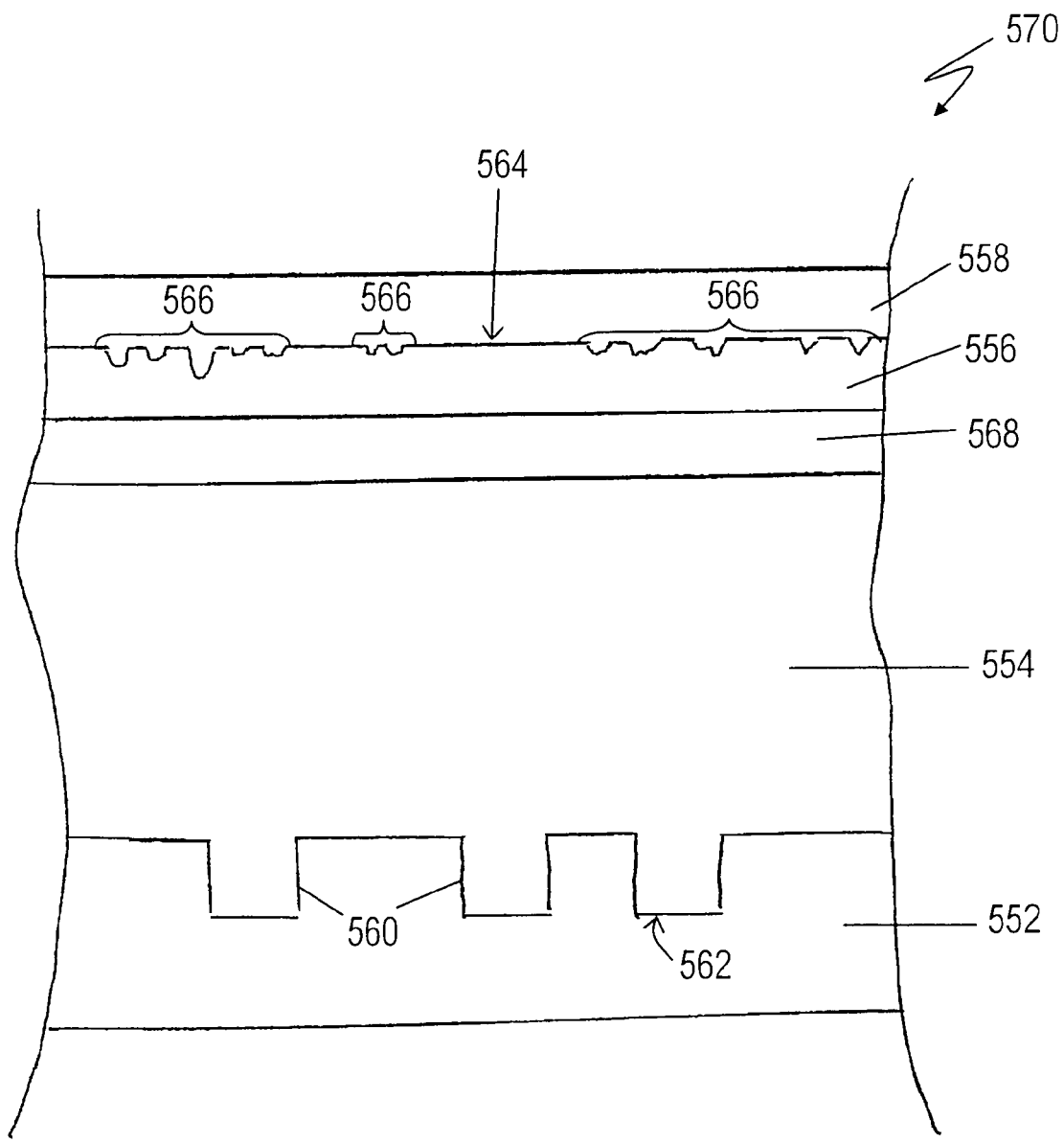
FIG. 8 illustrates a structure of an optical data carrier according to a further embodiment.

FIG. 8 illustrates a sectional view of a further Blu-ray disc 570. Similar as in the embodiments of FIGS. 3 and 4, when comparing the embodiment of FIG. 8 with the embodiment of FIG. 7, a further resin layer 568 may be provided between resin layer 556 and polycarbonate layer 554. As explained above, further resin layer 568 might be referred to as an "adaptation layer" realizing a strong adhesion force between resin layer 556 and polycarbonate layer 554.

The embodiments shown in FIGS. 7 and 8 exemplary show Blu-ray discs having a storage capacity of 25 Gigabyte (BD25). Thus, in the embodiments of FIGS. 7 and 8, there is only one pits and lands structure 560. The explained principles, however, are likewise applicable for Blu-ray discs having a higher storage capacity such as e.g. 50 Gigabyte, 75 Gigabyte, 100 Gigabyte or more (BD 50, BD 75, BD 100). In this case, there might be two, three, four or more layers of pits and lands structures. The layers could be covered with different reflective material and respective space layers may be arranged between the different layers with the pits and lands structures.

It should be noted that although FIGS. 3 to 8 are related to examples of standard data carriers (CD, DVD, Blu-ray), the principle of embossing an essentially uncured resin layer with a relief defining a graphic is likewise applicable to any other optical data carrier. Also, the structures of FIGS. 3 to 6 are only an example and different structures are possible. In fact, the uncured resin layer may be provided on the side of a data carrier with an arbitrary structure below. In other words, the structures of the lower layers of FIGS. 3 to 8 are only examples and other structures are possible.

Figure 9:
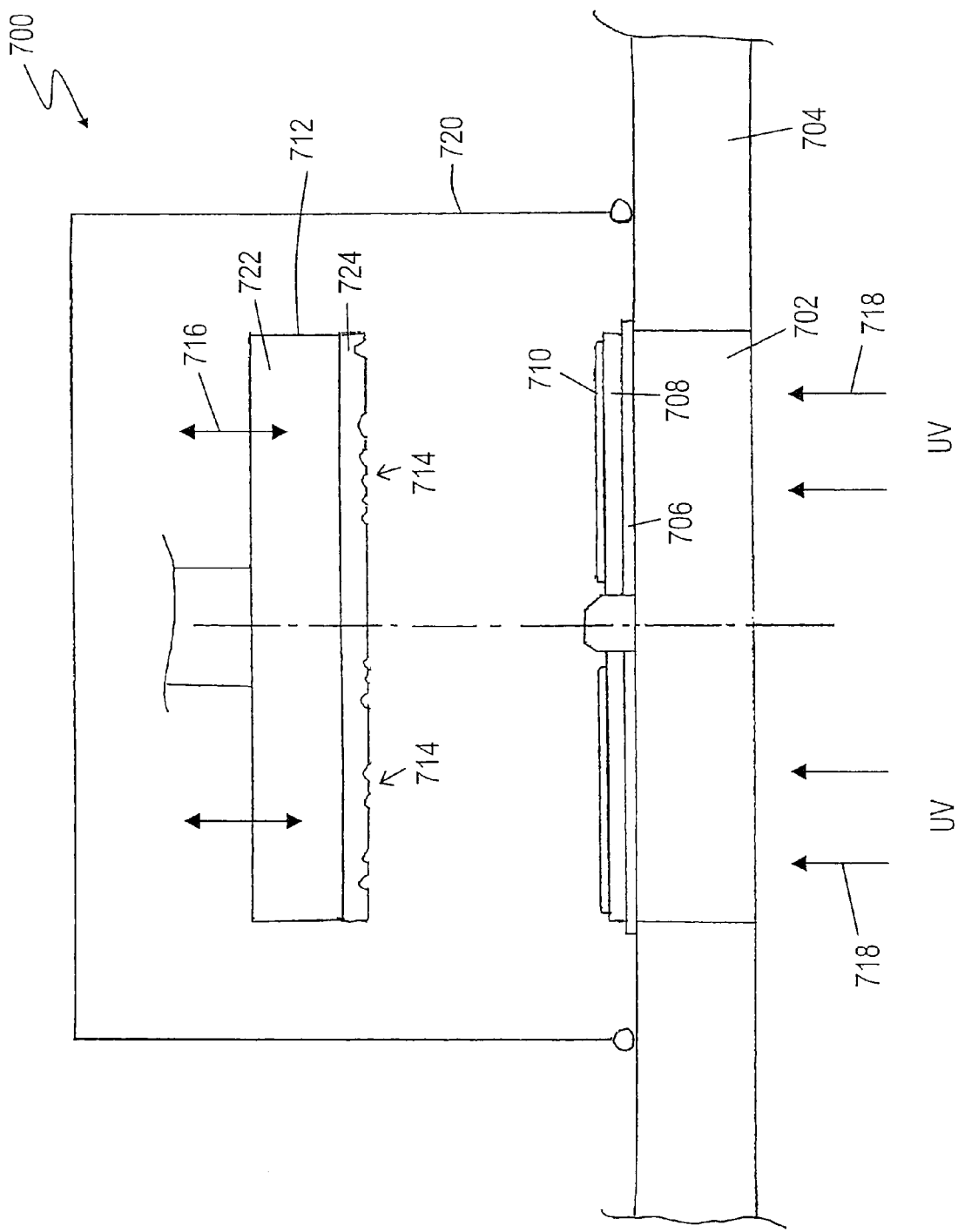
FIG. 9 illustrates an apparatus for manufacturing an optical data carrier.

FIG. 9 illustrates an apparatus 700 for manufacturing an optical data carrier. Apparatus 700 comprises a support member 702 which is held by a further support member 704. Support member 702 might be made out of a transparent material, e.g. glass. Further support member 704 need not be transparent and might e.g. be made of metal.

Optionally, apparatus 700 comprises an elastic support member 706 made e.g. from silicon or similar material. Elastic support member 706 has a "spring function". Thus, the force applied onto a stamper/data carrier during embossing as described in the following might be distributed evenly along the surface of the stamper/data carrier.

When manufacturing an optical data carrier comprising a relief pattern as described above, an optical data carrier 708 is placed on elastic support member 706, and an uncured resin layer 710 is provided on the surface of optical data carrier 708.

In order to emboss the uncured resin layer 710 with a relief pattern, a stamper 712 comprising a respective relief pattern 714 is used. As indicated by arrows 716, stamper 712 might be raised/lowered in order to realize the embossing process.

As should be self-evident from FIG. 9, in order to emboss the uncured resin layer 710 with a respective relief pattern, stamper 712 is lowered and pressed onto uncured resin layer 710 provided on optical data carrier 708. Stamper 712 might be pressed onto uncured resin layer 710/optical data carrier 708 with a force in the range of 0.45 N/cm$^2$ to 17.70 N/cm$^2$ (5 kg to 200 kg), i.e. with a low force While stamper 712 is in an embossing position, i.e. stamper 712 is in a low position where relief pattern 714 is in contact with uncured resin layer 710, uncured resin layer 710 is cured by switching on a light source (not shown in FIG. 9) providing ultraviolet (UV) light 718. UV light 718 passes through support member 702, elastic support member 706, and optical data carrier 708 in order to cure the resin layer 710.

Therefore, as said above, elastic support member 706 may be made of a transparent material.

In a further embodiment, first and/or second parts 722, 724 of the stamper may be made of a transparent material, e.g. out of glass. In this case, UV light for curing might be provided from inside or from above the stamper. Also, in this case, support member 702, elastic support member 706, and optical data carrier 708 may be made of a non-light transmitting material.

Alternatively to providing the elastic support member 706 between optical data carrier and support member 702, the elastic support member 706 might also be provided between a first part 722 and second part 724 (also referred to as shim) of stamper 712.

In a further embodiment, apparatus 700 might also comprise a vacuum chamber 720 for establishing a vacuum during the process of embossing/curing of resin layer 710. By embossing the resin layer 710 under vacuum condition, air bubbles in the resin may be avoided. Further, since the resin layer is "wet" only very low pressures are needed for a perfect transcription of the relief pattern 714 in second part 724 of stamper 712. Further, no heat source or the like is needed that would be needed if the embossing were done in a cured resin.

Due to the low pressures, optical data carrier 708 does not get any stress and therefore the quality of the finished product is high. Further, since resin layer 710 is embossed in an uncured state, the resin follows all etches and corners (cavities/protrusions) of relief pattern 714 on stamper 712 perfectly in order to have a high quality appearance of the relief pattern on the finished optical data carrier. The smaller the structures, the finer the lines and the better the image quality is.

Further, since resin layer 710 is in an uncured state during embossing, stamper 712 only needs to be pressed onto resin layer 710 for a very short period of time. For example, a few tenths of seconds (0.1-0.6 seconds) or even less time is sufficient. The curing might take 0.6-1.2 seconds depending on the material of the uncured resin layer. Thus, manufacturing speed can be increased which is an important factor in mass production.

Stamper 712 might e.g. be made of metal such as e.g. nickel. As already explained above, the material for resin layer 710 is chosen such that it might not "stick" to stamper 712. In other words, the material chosen for resin layer 710 should be easily removable from the material of stamper 712.

After the resin layer 710 has been cured by the flashed UV light 718, the stamper 712 is removed and the apparatus 700 (embossing unit) is vented.

The invention claimed is:

1. An optical data carrier comprising:
a resin layer with an embossed relief pattern, wherein said embossed relief pattern defines a graphic, a first level of molecular stress of said resin layer is below a second level of molecular stress that occurs when embossing a cured resin layer with a relief pattern, a further resin layer is sandwiched between said resin layer and a lower layer, said resin layer, said further resin layer, and said lower layer comprise a first, second, and third material, respectively, and a first adhesion force between said first and second material and a second adhesion force between said second and third material are larger than a third adhesion force between said first and third material.

2. The optical data carrier according to claim 1, wherein said resin layer is provided on further layers of said optical data carrier, said further layers having respective third levels of molecular stresses which are respectively lower than respective molecular stresses that occur within said further layers when embossing a cured resin layer with a relief pattern thereby applying a force to said further layers causing said respective molecular stresses.

3. The optical data carrier according to claim 1, wherein said resin layer has no undesired embossing artifacts that would occur if said resin layer were embossed with said relief pattern in a cured state.

4. An optical data carrier comprising:
a resin layer with an embossed relief pattern, wherein said embossed relief pattern defines a graphic, a first level of molecular stress of said resin layer is below a second level of molecular stress that occurs when embossing a cured resin layer with a relief pattern under high pressure of 88.6 N/cm$^2$ or more, a further resin layer is sandwiched between said resin layer and a lower layer, said resin layer, said further resin layer, and said lower layer comprises a first, second, and third material, respectively, and a first adhesion force between said first and second material and a second adhesion force between said second and third material are larger than a third adhesion force between said first and third material.

* * * * *